United States Patent [19]

Snelgrove

[11] 4,303,718

[45] Dec. 1, 1981

[54] PRINTING INK FORMULATIONS

[75] Inventor: James A. Snelgrove, Monson, Mass.

[73] Assignee: Monsanto Company, St. Louis, Mo.

[21] Appl. No.: 157,998

[22] Filed: Jun. 9, 1980

[51] Int. Cl.³ .......................... B32B 3/10; B32B 7/14; B32B 27/30
[52] U.S. Cl. ..................................... 428/201; 106/22; 260/30.4 R; 260/37 P; 260/37 R; 428/200; 428/210; 428/437; 428/525
[58] Field of Search ............... 428/525, 437, 200, 201, 428/210; 8/552; 260/30.4 R, 37 P, 37 R; 106/22; 525/61, 56

[56] References Cited

U.S. PATENT DOCUMENTS

| 3,591,406 | 7/1971 | Moynihan | 428/437 |
| 3,973,058 | 8/1976 | Grover | 428/437 |
| 4,230,775 | 10/1980 | Derick | 428/525 |

FOREIGN PATENT DOCUMENTS

| 717387 | 10/1954 | United Kingdom | 428/437 |
| 2010300 | 6/1979 | United Kingdom | 428/437 |

Primary Examiner—Ellis P. Robinson
Attorney, Agent, or Firm—David Bennett; William J. Farrington; Paul D. Matukaitis

[57] ABSTRACT

Ink formulations for use in printing polyvinyl butyral sheets are described. The formulations comprise polyvinyl formal, and polyvinyl butyral sheets printed using the formulations are found to have a reduced tendency to exhibit blocking.

4 Claims, No Drawings

PRINTING INK FORMULATIONS

BACKGROUND OF THE INVENTION

This invention relates to ink formulations for use in printing polyvinyl butyral sheets particularly sheets that are to be laminated and used as safety glass interlayers and particularly windshield interlayers provided with a gradient color band to reduce glare.

One of the problems that has to be confronted in dealing with polyvinyl butyral sheet is that when wound onto rolls after production it tends to stick to adjacent laps on the roll making separation difficult. This is known as "blocking" and can also occur when two flat sheets are laid one on top of the other.

The printing of polyvinyl butyral sheets is usually accomplished using an ink formulation comprising a dye and a solvent and an additive to raise the viscosity to a level appropriate for the intended printing operation. This may be a relatively low value as for example in ink-jet or electrostatic mist printing, or a relatively high value as for example in rotogravure printing. Whatever the required viscosity the most practical way of achieving the adjustment is by the addition of a high molecular weight compound that is soluble in the ink solvent and is not incompatible with any other component of the ink.

DESCRIPTION OF THE PRIOR ART

One way of adjusting the viscosity of the ink formulation is by the addition of polyvinyl butyral as described in U.S. Pat. No. 3,551,406 and U.S. Pat. No. 3,973,058. It is found however that this expedient has the result of increasing the tendency of the printed areas to "block".

This effect is somewhat reduced by the process described in the British printed patent application No. 2,010,300A which describes the use of a polyvinyl butyral having a hydroxyl content of 25 to 35 weight percent as a component of the ink formulation.

It has now been found that the ink viscosity can be adjusted over a wide range using a polymeric additive that can at the same time reduce the blocking significantly below that displayed by even unprinted sheets.

DESCRIPTION OF THE INVENTION

The ink formulation of the invention comprises a dye, a solvent medium and a polyvinyl formal in an amount sufficient to raise the viscosity of the ink formulation to a level dictated by the printing process in which the formulation is to be used.

The most significant advantage afforded by the invention is that, rather than causing increased blocking, the effect is actually found to be below that observed for even unprinted sheet. Thus, while providing a useful means of adjusting the ink formulation viscosity to a desired level, the polyvinyl formal actually reduces significantly the tendency of printed polyvinyl butyral sheets to stick together.

The ink base itself is a conventional one comprising a dye and a solvent medium. Most conventional ink solvents can be used since they are also solvents for the polyvinyl formal. Typical suitable solvents include N-methyl pyrollidone, dimethyl acetamide, dimethyl formamide, cyclohexanone, tetrahydrofuran and mixtures of the above alone or with nonsolvents such as toluene.

The amount of polyvinyl formal added to the printing ink formulation will, as indicated above, be determined to some extent by the nature of the printing operation with which the ink formulation is to be used. In some processes a very fluid ink is required whereas in others a highly viscous ink may be desired.

For gravure printing the ink viscosity is conventionally measured by the Shell Cup technique in which the ink formulation is placed in a standard cup and the time to flow out through a standard aperture is measured. Using the #3 Shell cup, a viscosity of between 15 and 50 seconds is generally required for a gravure printing ink formulation. Other types of printing may require higher or lower viscosities however.

The extent of the ink viscosity adjustment obtained by the incorporation of the polyvinyl formal is dependent on the amount of polyvinyl formal in the formulation and on the molecular weight of the polyvinyl formal. A higher molecular weight polyvinyl formal will be required in smaller amounts to achieve any desired viscosity level than would be required of a lower molecular weight polyvinyl formal. Thus in selecting the amount of polyvinyl formal to be used, two factors to be considered are its molecular weight and the desired ink viscosity for the intended printing operation. In practice the beneficial effects of the use of polyvinyl formal become apparent when two percent or more by weight is used in the formulation. The upper limit is dictated largely by cost and the availability of a polyvinyl formal with a suitable molecular weight but more than 15 percent by weight of polyvinyl formal is not often required for most printing operations. The above percentages of polyvinyl formal are based on the weight of the ink base, i.e., the weight of dye plus solvent in the formulation.

Polyvinyl formal as conventionally made does not comprise solely formal units pendant from the polymer chain. Usually the product contains from 5 to 45 percent by weight of acetate groups, measured as vinyl acetate, and from 2 to 15 percent by weight of hydroxyl groups, measured as vinyl alcohol. The preferred polyvinyl formals for use in the invention comprise from 8 to 35 percent of acetate groups and from 2 to 10 percent of hydroxyl groups in each case measured by weight as vinyl acetate and vinyl alcohol groups respectively.

The weight average molecular weight of the polyvinyl formal can vary widely from, for example, 8,000 to 200,000 but the preferred polymers have a weight average molecular weight of from 8,000 to 50,000 and particularly from 15,000 to 40,000.

As indicated above the amount of the polyvinyl formal added for preferred gravure printing operations is from 2 to 15 percent by weight based on the weight of the ink base formulation. In general however, the best results are obtained at from 3 to 10 percent and preferably 3 to 8 percent by weight addition levels.

The ink may comprise other components conventional in such compositions if desired such as U.V. stabilizers, antioxidants and the like.

DESCRIPTION OF THE PREFERRED EMBODIMENTS

The following Examples are for the purposes of illustration only and are not intended to imply any limitation on the essential scope of the invention.

The various parameters referred to in the Examples were determined as indicated below.

The viscosity of the ink was measured using a Shell Cup Viscometer (#3 Cup) using the technique recommended by the manufacturer (Shell Cup Viscometers, 1970, page 6, published by Shell Chemical Company, Petrochemicals Division). The technique involves measurement of flow time from a standard cup through a standard aperture. The viscosity is measured in seconds to flow out of the cup.

The inherent blocking of the sheets was measured by press polishing the surfaces of two sheets to remove any surface geometry variations, bringing the polished surfaces into intimate contact and then measuring the force required to separate them. This gives a good indication of the contribution to the blocking phenomenon that can be attributed directly to the formulation.

The test used to determine the adhesion between a PVB sheet printed with the ink formulation of the invention and a glass layer is known as the "peel adhesion test". The test is performed on a laminate of an adhesive coated aluminum foil, a PVB interlayer, and a glass sheet which has been laminated, with the printed side of the PVB layer contacting the glass, in an oil autoclave under about 12 atmospheres pressure and 149° C. for seven minutes. The glass layer is cut through and one part is inserted in the jaws of an Instron tensile tester pulling at 90° to the plane of the rest of the laminate. The force required to peel the foil/interlayer from the glass is measured and reported in Newtons/cm.

EXAMPLE 1

A number of ink formulations were obtained and a polyvinyl butyral sheet was printed with each under identical conditions. Three of the formulations "A", "B" and "C" were according to the invention and contained 3.7 percent by weight of polyvinyl formal. A further formulation "Control 1" contained polyvinyl butyral at an equivalent level and represents the prior art. "Control 2" shows the effect of the sheet alone unprinted by any ink formulation.

In each case a 0.4 mm sheet of polyvinyl butyral was printed with the ink composition, seasoned at 60° C. for seven days and allowed to cool to room temperature and stored for three days. The sheets were then tested for inherent blocking and peel adhesion at a moisture level in the sheet of about 0.4 percent. The results are set forth in Table I below. The ink used was a conventional blue dye in a solvent capable of dissolving both the dye and the polyvinyl formal.

molecular weight of 24,000 to 40,000, a hydroxyl content (measured as vinyl alcohol) of 5 to 6 percent by weight and an acetate content, (measured as vinyl acetate), of 9.5 to 13 percent by weight. The "invention" formulation had a Shell #3 cup viscosity of 31 seconds.

The second formulation "Control" comprised 3.7 percent by weight of a polyvinyl butyral, had a Shell #3 cup viscosity of from 25 to 30 and was identical to "Control 1" used in Example 1.

The "inherent blocking" and "peel adhesion" were measured for polyvinyl butyral automobile interlayer sheets printed with the two formulations and for comparison sake also for unprinted sheet. All the sheets, printed and unprinted, were seasoned in a laboratory oven at 60° C. for seven days and allowed to cool at room temperature for a further three days before being tested. The blocking was tested at a measured water content of 0.40 percent and the adhesion at a water content of 0.45 percent. The results are set forth in Table 2 below:

TABLE II

|  | INHERENT BLOCKING gm/cm | PEEL ADHESION N/cm |
|---|---|---|
| Invention | 8 | 12 |
| Control | 120 | 14 |
| Unprinted | 80 | 18 |

It can be seen from the above that the spectacular drop in blocking observed upon replacement of polyvinyl butyral with polyvinyl formal is accompanied by only a minor downward adjustment of peel adhesion.

It is anticipated that there could be a number of minor variations in or modifications to the formulations described above without departing from the essential concept of the invention. It is intended that all such variations and modifications should fall within the general purview of this invention.

What is claimed is:

1. A polyvinylbutyral interlayer printed with an ink formulation comprising a dye, a solvent medium and a polyvinyl formal in an amount sufficient to reduce blocking between polyvinyl butyral sheets printed using such a formulation.

2. A polyvinyl butyral interlayer printed with a printing ink formulation having a Shell #3 cup viscosity of from 15 to 50 seconds and comprising from 3 to 10 percent by weight of the ink base of a polyvinyl formal having a number average molecular weight of from 15,000 to 40,000 and an acetate content of from 8 to 35

TABLE I

|  | FORMULATION | | | | |
|---|---|---|---|---|---|
|  | A | B | C | CONTROL 1 | CONTROL 2 |
| (1)PVF (PVB) | PVF | PVF | PVF | PVB | None |
| Molecular wt. | 26,000–34,000 | 16,000–20,000 | 10,000–15,000 | 180,000–270,000 | — |
| Acetate Content | 22–30% | 9.5–13% | 9.5–13% | 0–2.5% | — |
| Hydroxyl Content | 5.5–7% | 5.0–6.5% | 5.0–6.5% | 17–20% | — |
| (2)Viscosity of ink formulation (sec.) | 10 | 8 (approx.) | 5 (approx) | 25–30 |  |
| (3)Inherent blocking (gm/cm) | 10.8 ± 2.1 | 17.6 ± 2.8 | 18.1 ± 3.9 | 103.9 ± 19.9 | 36.7 ± 7.0 |
| (4)Peel Adhesions (N/cm) | 41.8 | 36.9 | 39.8 | 40.2 | 45.0 |

(1)PVF is polyvinyl formal; PVB is polyvinyl butyral. Acetate and Hydroxyl contents are measured by weight calculated as vinyl acetate and vinyl alcohol respectively.
From the above it will be noted that the inherent blocking of the polyvinyl formal formulations is greatly reduced by comparison with the polyvinyl butyral formulation and is even better than the unprinted sheet while the effect on the peel adhesion is reasonably marginal.

EXAMPLE 2

Two printing ink formulations were produced. These were identical except that one (Invention) contained 5 percent of a polyvinyl formal having a weight average percent by weight, measured as vinyl acetate, and a hydroxyl content of from 2 to 10 percent by weight measured as vinyl alcohol.

3. A laminate comprising a glass sheet and an interlayer according to claim 1.

4. A laminate comprising a glass sheet and an interlayer according to claim 2.

* * * * *